US012603747B2

(12) United States Patent　(10) Patent No.:　US 12,603,747 B2
Liu　(45) Date of Patent:　Apr. 14, 2026

(54) METHOD FOR FREQUENCY RESOURCE AUTHORIZATION AND DEVICE

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 727 days.

(21) Appl. No.: 17/924,654

(22) PCT Filed: May 22, 2020

(86) PCT No.: PCT/CN2020/091937
§ 371 (c)(1),
(2) Date: Nov. 10, 2022

(87) PCT Pub. No.: WO2021/232439
PCT Pub. Date: Nov. 25, 2021

(65) Prior Publication Data
US 2023/0198720 A1　Jun. 22, 2023

(51) Int. Cl.
*H04L 5/00*　(2006.01)
*H04W 72/0453*　(2023.01)

(52) U.S. Cl.
CPC ....... *H04L 5/0053* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 11,928,665 | B2* | 3/2024 | Datta ................. | G06Q 20/3278 |
| 2009/0279494 | A1 | 11/2009 | Halbauer et al. | |
| 2019/0253878 | A1 | 8/2019 | Yu et al. | |
| 2019/0394704 | A1* | 12/2019 | Lou ....................... | H04W 16/14 |
| 2021/0168619 | A1* | 6/2021 | Park ................. | H04W 72/0453 |
| 2023/0345439 | A1* | 10/2023 | Sun ........................ | H04W 16/14 |

FOREIGN PATENT DOCUMENTS

| | | |
|---|---|---|
| CN | 1571528 A | 1/2005 |
| CN | 101605321 A | 12/2009 |
| CN | 101772173 A | 7/2010 |
| CN | 104079351 A | 10/2014 |
| CN | 106233813 A | 12/2016 |

(Continued)

OTHER PUBLICATIONS

International Search Report issued in Application No. PCT/CN2020/091937, dated Feb. 23, 2021 with English translation, (4p).

(Continued)

*Primary Examiner* — Phirin Sam
(74) *Attorney, Agent, or Firm* — Arch & Lake LLP

(57) ABSTRACT

A method for frequency resource authorization method including: receiving a first request sent by a terminal, the first request being used for requesting to authorize the terminal to use a target frequency in an available frequency band within a first duration, the available frequency band at least partially overlapping with a terahertz frequency band; and sending a response message to the terminal according to the first request.

19 Claims, 6 Drawing Sheets

Send a first request to an access network device ⌐301

Receive a response message by a terminal ⌐302

(56) References Cited

FOREIGN PATENT DOCUMENTS

| | | | |
|---|---|---|---|
| CN | 106304091 | A | 1/2017 |
| CN | 108183738 | A | 6/2018 |
| CN | 108337688 | A | 7/2018 |
| CN | 109644491 | A | 4/2019 |
| CN | 109792662 | A | 5/2019 |
| CN | 110971547 | A | 4/2020 |
| WO | 2016044991 | A1 | 3/2016 |

OTHER PUBLICATIONS

Document 5A/TEMP/67(Rev.1), "Technical and operational characteristics of the land mobile service applications operating in the frequency range 275-450 GHz", (WRC-19 agenda item 1.15), Annex 29 to Working Party 5A Chairman's Report, International Telecommunication Union,(13p), (Mar. 16, 2022).
The First CNOA of Application No. 202080001078.9 dated on Jun. 29, 2021 with English translation,(24p).
The Second CNOA of Application No. 202080001078.9 dated on Mar. 3, 2022 with English translation,(22p).
The Notification to Grant Patent Right for Invention in Application No. 202080001078.9 dated on Jul. 29, 2022 with English translation,(6p).

* cited by examiner

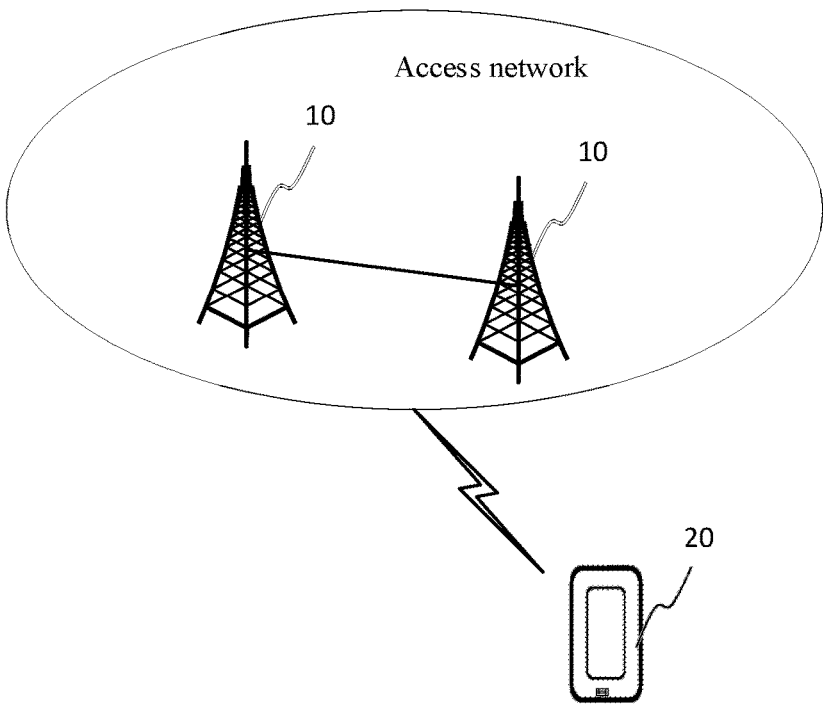
FIG. 1
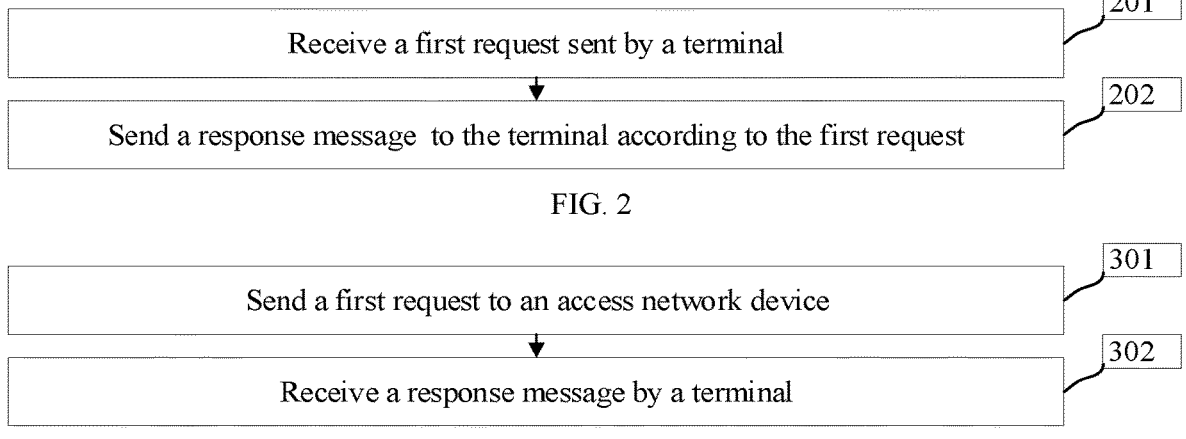
FIG. 2
FIG. 3

METHOD FOR FREQUENCY RESOURCE AUTHORIZATION AND DEVICE

CROSS REFERENCE

The present application is a U.S. National Stage of International Application No. PCT/CN2020/091937, filed on May 22, 2020, the entire content of which is incorporated herein by reference for all purposes.

TECHNICAL FIELD

The present disclosure relates to the field of communication technology, and in particular, to a method for frequency resource authorization, an apparatus, and a computer-readable storage medium.

BACKGROUND

With the development of communication technology, frequency resources used for communication are developed in a high-frequency direction. In a communication system after 5G, a frequency resource will develop to a millimeter wave frequency band and a terahertz frequency band.

SUMMARY

According to a first aspect of the present disclosure, there is provided a method frequency resource authorization, including:

receiving a first request sent by a terminal, where the first request is used for requesting to authorize the terminal to use a target frequency in an available frequency band within a first duration, and the available frequency band at least partially overlaps with a terahertz frequency band; and sending a response message to the terminal according to the first request.

According to a second aspect of the present disclosure, there is provided a method for frequency resource authorization, including:

sending, by a terminal, a first request to an access network device, where the first request is used for requesting to authorize the terminal to use a target frequency in an available frequency band within a first duration, and the available frequency band at least partially overlaps with a terahertz frequency band;

receiving a response message, where the response message is sent by the access network device according to the first request.

According to a third aspect of the present disclosure, there is provided a device for frequency resource authorization, including: a processor; and a memory configured to store an executable instruction by the processor, where the processor is configured to load and execute the executable instruction to implement the method for frequency resource authorization according to the first aspect.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 1 is a block diagram of a communication system according to an embodiment;

FIG. 2 is a flowchart of a method for frequency resource authorization according to an embodiment;

FIG. 3 is a flowchart of a method for frequency resource authorization according to an embodiment;

DETAILED DESCRIPTION

Figure 4:
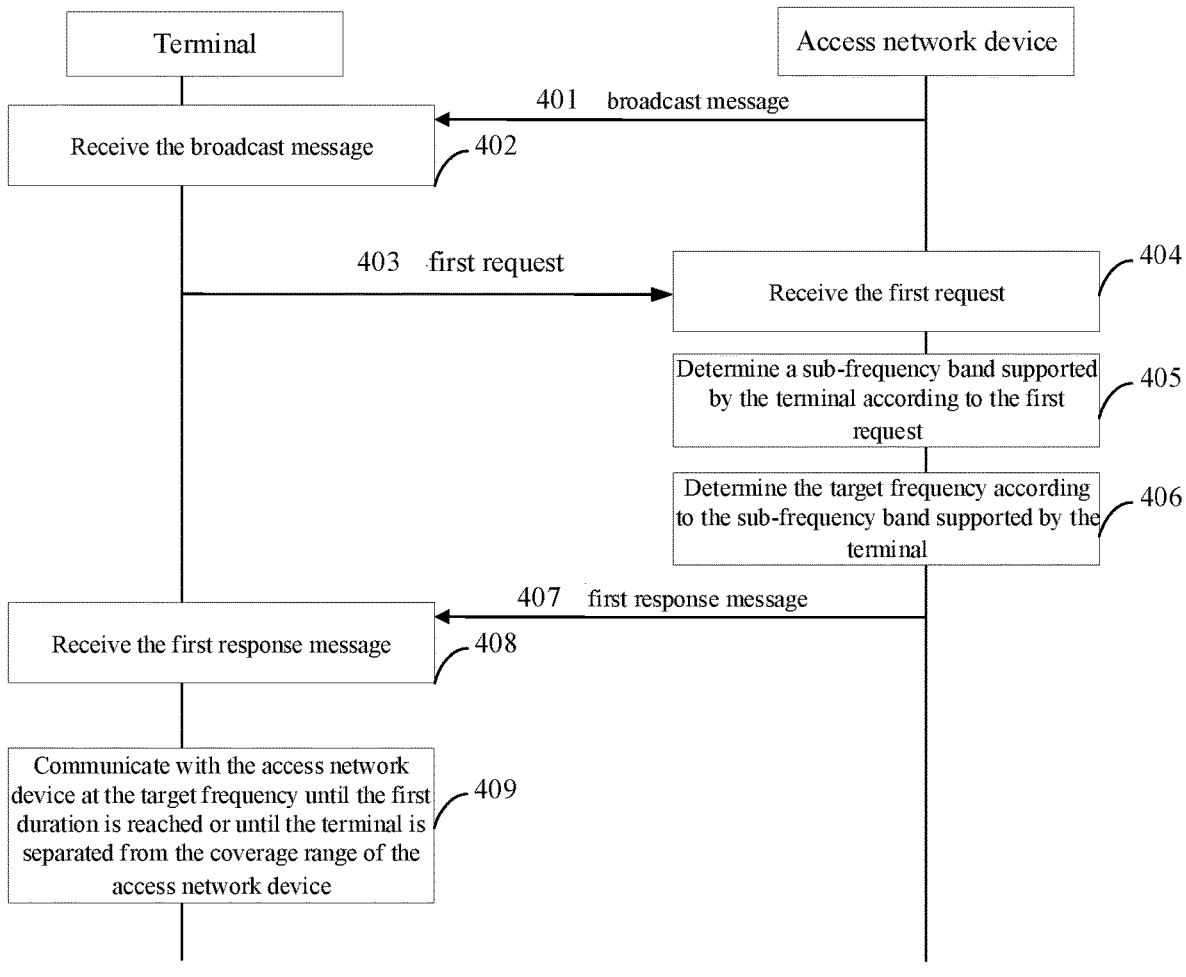
FIG. 4 is a flowchart of a method for frequency resource authorization according to an embodiment.

Embodiments will be described in detail herein, examples of which are illustrated in the accompanying drawings. The following description refers to the accompanying drawings in which the same numbers in different drawings represent the same or similar elements unless otherwise represented. The embodiments described in the following embodiments do not represent all implementations consistent with the present disclosure. Rather, they are merely examples of apparatuses and methods consistent with some aspects of the present disclosure as detailed in the appended claims.

The term used in the embodiments of the present disclosure is for the purpose of describing particular embodiments only and is not intended to limit the embodiments of the present disclosure. As used in the embodiments of the present disclosure and the appended claims, the singular forms "a" and "the" are also intended to include plural forms unless the context clearly indicates other meanings. It should also be understood that the term "and/or" as used here refers to and includes any or all possible combinations of one or more associated listed items.

It should be understood that although the terms first, second, third, etc. may be used in the embodiments of the present disclosure to describe various information, the information should not be limited to these terms. These terms are only used to distinguish the same type of information from each other. For example, without departing from the scope of the embodiments of the present disclosure, the first information may also be referred to as second information, and similarly, the second information may also be referred to as first information. Depending on the context, the words "if" and "in case that" as used herein may be interpreted as "at the time of" or "when" or "in response to determining that".

It should be understood that although the steps are described by numbers in the embodiments of the present disclosure for facilitating understanding, these numbers do not represent the order of execution of the steps, and do not represent that the steps with sequential numbers must be executed together. It should be understood that one or more of the plurality of steps of sequential numbers may be performed separately to solve a corresponding technical problem and achieve a predetermined technical solution. Even if a plurality of steps is exemplarily listed together in the drawings, and it does not represent that these steps are to be performed together, these steps are exemplarily listed together in the drawings for ease of understanding.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 is a block diagram of a communication system according to an embodiment. Referring to FIG. 1, the mobile communication system may include an access network device 10 and a terminal 20.

The access network device 10 is deployed in a wireless access network to provide a wireless access function for the terminal 20. The access network device may be a base station (BS). The access network device 10 may wirelessly communicate with the terminal 20 via one or more antennas. The access network device 10 may provide communication coverage for a geographic area where the access network device 10 is located. The base station may include different types, such as a macro base station, a micro base station, a relay station, and an access point. In some embodiments, the base station may be referred by those skilled in the art to as a base station transceiver, a wireless base station, an access point, a wireless transceiver, a basic service set (BSS), an extended service set (ESS), a Node B, an Evolved Node B (eNB or eNodeB), or some other suitable terms. Exemplarily, in a 5G system, a base station is referred to as a gNB. For ease of description, in the embodiments of the present disclosure, the device for providing a wireless communication function for the terminal 20 is collectively referred to as an access network device.

The terminal 20 may be interspersed throughout the mobile communication system, and each terminal 20 may be stationary or mobile. The terminal 20 may also be referred to by those skilled in the art as a mobile station, a subscriber station, a mobile unit, a user unit, a wireless unit, a remote unit, a mobile device, a user equipment, a wireless device, a wireless communication device, a remote device, a mobile subscriber station, an access terminal, a mobile terminal, a wireless terminal, a remote terminal, a handheld device, a user agent, a mobile client, a client, or some other suitable terms. The terminal 20 may be a cellular phone, a personal digital assistant (PDA), a wireless modem, a wireless communication device, a handheld device, a tablet computer, a laptop computer, a cordless telephone, a wireless local loop (WLL) station, and the like. The terminal 20 can communicate with the access network device 10 in the mobile communication system.

The access network device 10 and the terminal 20 may communicate with each other by means of air interface technology, for example, communicate with each other by means of cellular technology. The communication link between the access network device 10 and the terminal 20 may include: a downlink (DL) transmission from the access network device 10 to the terminal 20, and/or an uplink (UP) transmission from the terminal 20 to the access network device 10. Downlink transmission may also be referred to as forward link transmission, and uplink transmission may also be referred to as reverse link transmission. In some examples, the downlink transmission may include a transmission of a discovery signal, which may include a reference signal and/or a synchronization signal.

The mobile communication system shown in FIG. 1 May be a long term evolution (LTE) system, or may be a next generation evolution system based on an LTE system, such as an LTE-A (LTE-Advanced) system or a fifth generation (5G) system (also referred to as an NR system), or may be a next generation evolution system based on a 5G system, such as a beyond 5th generation (B5G) system, a sixth generation (6G) system, and the like. In the embodiments of the present disclosure, the terms "system" and "network" are often used interchangeably, but those skilled in the art may understand their meanings.

The communication system and the service scenario described in the embodiments of the present disclosure are intended to more clearly illustrate the technical solutions of the embodiments of the present disclosure, and do not constitute a limitation on the technical solutions provided in the embodiments of the present disclosure. Those of ordinary skill in the art may know that, with the evolution of a communication system and the occurrence of a new service scenario, the technical solutions provided in the embodiments of the present disclosure are also applicable to similar technical problems.

In a communication system using a millimeter wave frequency band and a terahertz frequency band for communication, the frequency band capable of being used is wide, and the coverage range of the access network device is small, that is, the number of terminals within the coverage range of one access network device is relatively small, and if the allocation mode of the frequency resources in the communication system of 5G and before 5G is still used, the communication efficiency is low. Embodiments of the present disclosure provide a method for frequency resource authorization and apparatus, and a computer-readable storage medium, which can improve the communication efficiency of a communication system.

FIG. 2 is a flowchart of a method for frequency resource authorization according to an embodiment. The method may be executed by an access network device. Referring to FIG. 2, the method includes the following steps:

In step 201, a first request sent by a terminal is received, where the first request is used for requesting to authorize the terminal to use a target frequency in an available frequency band within a first duration, and the available frequency band at least partially overlaps with a terahertz frequency band.

In step 202, a response message is sent to the terminal according to the first request.

The response message is one of a first response message and a second response message, the first response message includes indication information of the target frequency, and the second response message is used for indicating authorization rejection.

In some embodiments, the first response message further includes indication information for indicating the first duration.

In some embodiments, the available frequency band includes more than one sub-frequency band, the first request includes indication information for indicating a sub-frequency band set supported by the terminal, the sub-frequency band set supported by the terminal includes at least one sub-frequency band, and the target frequency belongs to one of the sub-frequency band in the sub-frequency band set.

5

6

In some embodiments, the first request is used for requesting to authorize the terminal to use the target frequency within the first duration; or, the first request is used for requesting to authorize a terminal in a group where the terminal is located to jointly use the target frequency within the first duration.

In some embodiments, the method further includes:

determining, according to the first request, a sub-frequency band supported by the terminal, where a sub-frequency band supported by the terminal belongs to the available frequency band;

determining the target frequency according to the supported sub-frequency band of the terminal;

the sending the response message to the terminal according to the first request includes:

sending a first response message to the terminal, where the first response message includes indication information of the target frequency.

In some embodiments, the determining the target frequency according to the sub-frequency band supported by the terminal includes:

obtaining first bandwidth information of the terminal, where the first bandwidth information is used for indicating a bandwidth supported by or a bandwidth required for the terminal;

selecting, from the sub-frequency bands supported by the terminal, a frequency matching the bandwidth indicated by the first bandwidth information as the target frequency.

In some embodiments, the determining the target frequency according to the sub-frequency band supported by the terminal includes:

determining the target frequency according to the sub-frequency band supported by the terminal on the basis of a service priority of the terminal.

In some embodiments, the method further includes:

receiving second bandwidth information sent by the terminal, where the second bandwidth information is used for indicating an instant demand bandwidth of the terminal;

adjusting a frequency domain width of the target frequency of the terminal to the instant demand bandwidth indicated by the second bandwidth information in response to determining that the instant demand bandwidth indicated by the second bandwidth information is different from the frequency domain bandwidth of the target frequency.

In some embodiments, the method further includes:

obtaining spatial position information of the terminal according to the first request;

selecting the target frequency for the terminal from a sub-frequency band corresponding to the spatial position information of the terminal according to a corresponding relationship between the spatial position information and the sub-frequency band;

The sending the response message to the terminal according to the first request, includes:

sending a first response message to the terminal, where the first response message includes indication information of the target frequency.

In some embodiments, the method further includes:

sending a broadcast message, where the broadcast message includes indication information for indicating a sub-frequency band set supported by the access network device, the sub-frequency band set supported by the access network device includes at least one sub-frequency band, and the at least one sub-frequency band belongs to the available frequency band.

In some embodiments, the method further includes:

communicating with the terminal at the target frequency until a first duration is reached or until the terminal is separated from a coverage range of the access network device.

In some embodiments, the method further includes: releasing the target frequency in response to one of the followings:

a signal sent by the terminal using the target frequency being not received within a second duration, or the first duration ending, or the terminal being separated from the coverage area of the access network device.

In some embodiments, the available frequency band is the terahertz frequency band, or the available frequency band includes a partial frequency band of the terahertz frequency band, or the available frequency band is a combination of the terahertz frequency band and a partial millimeter wave frequency band close to the terahertz frequency band.

In some embodiments, a length unit of the first duration is day or month.

It should be noted that the foregoing steps 201 and 202 may be combined with the optional steps described above freely.

FIG. 3 is a flowchart of a method for frequency resource authorization according to an embodiment. The method may be executed by a terminal. Referring to FIG. 3, the method includes the following steps:

In step 301, a first request is sent to an access network device, where the first request is used for requesting to authorize a terminal to use a target frequency in an available frequency band within a first duration, and the available frequency band at least partially overlaps with a terahertz frequency band;

In step 302, a response message is received, where the response message is sent by the access network device according to the first request.

In some embodiments, the response message is one of a first response message and a second response message, the first response message includes indication information of the target frequency, and the second response message is used for indicating authorization rejection.

In some embodiments, the first response message further includes indication information for indicating the first duration.

In some embodiments, the available frequency band includes more than one sub-frequency band, the first request includes a sub-frequency band set supported by the terminal, the sub-frequency band set includes at least one sub-frequency band, and the target frequency belongs to one of the sub-frequency band in the sub-frequency band set.

In some embodiments, the first request is used for requesting to authorize the terminal to use the target frequency within a first duration; or the first request is used for requesting to authorize the terminal to exclusively use the target frequency within the first duration within a certain region range; or the first request is used for requesting to authorize a terminal in a group where the terminal is located to jointly use the target frequency within the first duration.

In some embodiments, the method further includes:

after receiving the first response message, sending second bandwidth information to the access network device, where the second bandwidth information is used for indicating an instant demand bandwidth of the terminal.

In some embodiments, the method further includes:

receiving a broadcast message, where the broadcast message includes indication information for indicating a sub-frequency band set supported by the access network device, the sub-frequency band set supported by the access network device includes at least one sub-frequency band, and the at least one sub-frequency band belongs to the available frequency band.

In some embodiments, the method further includes:

communicating with the access network device on the available frequency band until a first duration is reached or until the terminal is separated from a coverage range of the access network device.

In some embodiments, the available frequency band is the terahertz frequency band, or the available frequency band includes a partial frequency band of the terahertz frequency band, or the available frequency band is a combination of the terahertz frequency band and a partial millimeter wave frequency band close to the terahertz frequency band.

In some embodiments, a length unit of the first duration is day or month.

It should be noted that the foregoing steps 301-302 may be combined with the optional steps described above freely.

FIG. 4 is a flowchart of a method for frequency resource authorization according to an embodiment. The method may be executed by an access network device and a terminal together. Referring to FIG. 4, the method includes the following steps:

In step 401, the access network device sends a broadcast message.

The broadcast message includes indication information for indicating a sub-frequency band set supported by the access network device. The sub-frequency band set supported by the access network device includes at least a sub-frequency band. For example, the indication information may be an identifier of a sub-frequency band.

In the embodiments of the present disclosure, the available frequency band at least partially overlaps with the terahertz frequency band. In a possible implementation, the available frequency belongs to the terahertz frequency band, that is, the available frequency band is the terahertz frequency band (for example, 0.1 THz-10 THz), or the available frequency band includes a partial frequency band of the terahertz frequency band (for example, 0.1 THz-1 THz). In another possible implementation, the available frequency band includes the terahertz frequency band, for example, may be a combination of partial millimeter wave frequency band close to the terahertz frequency band (for example, 60 GHz-300 GHz) and the terahertz frequency band (0.1 THz-10 THz), that is, the available frequency band may be 60 GHz-10 THz.

For example, since the available frequency band is wide, it may be divided into more than one sub-frequency band. The sub-frequency bands in the sub-frequency band set supported by different access network devices may be completely the same, or may be partially the same.

In step 402, the terminal receives the broadcast message.

It should be noted that the steps 401 and 402 are optional steps, and in other embodiments, it can be defaulted that all the access network devices may support all sub-frequency bands of the available frequency band, and the sub-frequency band set supported by the terminal is the same as the sub-frequency band set supported by the access network device, or the sub-frequency band set supported by the terminal is a subset of the sub-frequency band set supported by the access network device. In this case, the access network device may not send a broadcast message carrying indication information for indicating the sub-frequency band set supported by the access network device.

In step 403, the terminal sends a first request, where the first request is used for requesting to authorize the terminal to use a target frequency in an available frequency band within a first duration.

In some embodiments, the first duration is a fixed value, and is agreed by a protocol; or, the first duration is a configuration value, which is configured by the access network device for the terminal. The first durations corresponding to different terminals may be the same or different.

In embodiments of the present disclosure, the first duration is far greater than the time domain length corresponding to the frame structure in the 4G system, in other words, the first duration and the length of the time domain corresponding to the frame structure in the 4G system are not in a same order of magnitude. For example, the first duration may be M days, N months, etc. Exemplarily, both M and N are natural numbers. The length of the first duration is not limited in the embodiments of the present disclosure, and may be set according to actual requirements.

In some embodiments, the first request includes indication information for indicating a sub-frequency band set supported by the terminal, the sub-frequency band set supported by the terminal includes at least one sub-frequency band of an available frequency band, and the target frequency belongs to one of the sub-frequency bands in the sub-frequency band set.

In some embodiments, the first request may further include at least one of the following information: a service priority of the terminal, capability information for indicating a bandwidth supported by the terminal, and demand information for indicating a required bandwidth of the terminal.

In some embodiments, the first request is used for requesting to authorize the terminal to use the target frequency within the first duration; or the first request is used for requesting to authorize the terminal to exclusively use the target frequency within the first duration within a certain region range; or the first request is used for requesting to authorize a terminal in a group where the terminal is located to jointly use the target frequency within the first duration.

In some embodiments, the first request adopts a newly added signaling, or the first request may be an information unit added in a connection request.

In step 404, the access network device receives the first request.

In step 405, the access network device determines a sub-frequency band supported by the terminal according to the first request.

In a possible implementation, if the first request includes indication information for indicating the sub-frequency band set supported by the terminal, the access network device may determine the sub-frequency band supported by the terminal according to the indication information used for indicating the sub-frequency band set supported by the terminal.

In another possible implementation, it can be defaulted that all sub-frequency bands may be supported by the terminal.

In step 406, the access network device determines the target frequency according to the sub-frequency band supported by the terminal.

That is, in the sub-frequency band supported by the terminal, the target frequency is allocated to the terminal, and only the frequency band supported by the terminal is scheduled, but the frequency band not supported by the terminal is not scheduled. After obtaining the target frequency, the terminal may send data to the access network device and/or receive data sent by the access network device at the target frequency.

In a possible implementation, step 406 includes:

obtaining first bandwidth information of the terminal, where the first bandwidth information is used for indicating a bandwidth supported by or a bandwidth required for the terminal;

selecting, from the sub-frequency bands supported by the terminal, a frequency matching with the bandwidth indicated by the first bandwidth information as the target frequency. That is, the frequency domain width of the target frequency is the same as the bandwidth indicated by the first bandwidth information.

In some embodiments, the first bandwidth information for indicating the bandwidth supported by the terminal may be obtained from the subscription data of the terminal, or may be carried in the first request sent by the terminal, and may be obtained by the access network device directly from the first request.

Exemplarily, the bandwidth supported by the terminal refers to the minimum bandwidth supported by the terminal. For the available frequency band, the bandwidth supported by the terminal may be large, for example, the bandwidth of 1 GHz is supported, but the actual data transmission amount of the terminal is small, that is, it is not necessary to use the large bandwidth. In this case, more than one bandwidth level can be configured, and the terminal may select a corresponding bandwidth level according to the data transmission amount of the terminal. For example, if the data transmission amount of the terminal is large, the required bandwidth of the terminal is also large. In a possible implementation, the terminal may carry the identifier of the bandwidth level in the first request, and the access network device may determine the bandwidth required for the terminal according to a corresponding relationship between the identifier of the bandwidth level and the bandwidth.

In another possible implementation, the step 406 includes:

determining the target frequency according to the sub-frequency band supported by the terminal on the basis of the service priority of the terminal.

The service priority of the terminal may be determined by an operator, for example, the service priorities corresponding to different tariff packages are different.

Exemplarily, the determining the target frequency on the basis of the service priority of the terminal includes at least one of the following manners:

if a first request sent by more than one terminal is received at the same time, the target frequency of the terminal is determined according to a high-low sequence of service priorities of the more than one terminal;

if the sub-frequency band supported by the first terminal is occupied, the target frequency of the first terminal is determined from the frequency allocated to the second terminal according to the service priority of the first terminal, and the service priority of the second terminal is lower than the service priority of the first terminal, that is, the first terminal with a higher service priority preempts the frequency resource from the second terminal with a lower service priority.

if the sub-frequency band supported by the first terminal is occupied by the second terminal with a higher service priority, the access network device puts the first terminal into the queue. When there is an idle frequency in the sub-frequency band supported by the first terminal, the target frequency is determined from the idle frequency.

In step 407, the access network device sends a first response message to the terminal, where the first response message includes indication information of the target frequency.

The first response message is used for instructing the access network device to authorize the terminal to use the target frequency in the available frequency band within the first duration.

In some embodiments, when the first duration is configured by the access network device, the first response message further includes indication information for indicating the first duration.

For example, the indication information of the target frequency may include a frequency starting position and an offset, and the terminal may determine the frequency ending position according to the frequency starting position and the offset, and the frequency between the frequency starting position and the frequency ending position is the target frequency.

In step 408, the terminal receives the first response message.

In some embodiments, the first response message may adopt a newly added signaling, or may be a response message corresponding to a connection request.

In step 409, the terminal communicates with the access network device at the target frequency until the first duration is reached or until the terminal is separated from the coverage range of the access network device.

In some embodiments, after step 409, the method may further include: releasing the target frequency, which is in response to one of the followings: the first duration ending, or the terminal being separated from the coverage range of the access network device.

Alternatively, after the access network device sends the first response message to the terminal, that is, after the target frequency is authorized to the first terminal, if the signal sent by the first terminal is not received within a second duration, the target frequency is released, so that the target frequency becomes an idle frequency, and the access network device may reallocate the target frequency to improve the resource utilization rate.

After step 409, if the terminal still needs to communicate with the access network device, the first request may be sent to the access network device again.

In some embodiments, in the process that the terminal communicates with the access network device by using the target frequency, the required bandwidth can be determined according to the currently required data transmission amount, and the instant demand bandwidth may be dynamically reported, so that the access network device adjusts the target frequency authorized to be used by the terminal according to the bandwidth currently required by the terminal. Therefore, the method further includes:

In a first step, the terminal sends second bandwidth information to the access network device, where the second bandwidth information is used for indicating the terminal instant demand bandwidth, and the instant demand bandwidth indicated by the second bandwidth information corresponds to the data transmission amount of the terminal, for example, may be the minimum bandwidth satisfying the data transmission amount of the terminal.

In a second step, the access network device receives the second bandwidth information.

In a third step, if the instant demand bandwidth indicated by the second bandwidth information is different from the frequency domain bandwidth of the target frequency currently used by the terminal, the frequency domain width of the target frequency of the terminal is adjusted to the instant demand bandwidth indicated by the second bandwidth information.

The first step may be performed periodically, or may be performed when the required bandwidth of the terminal changes.

The third step may include: the access network device sends a third response message to the terminal, where the third response message includes indication information of the adjusted target frequency.

In some embodiments, the adjusted target frequency is a part of the target frequency currently used by the terminal, or the adjusted target frequency may be a frequency different from the target frequency currently used by the terminal.

By sending the first request to the access network device, requesting the access network device to authorize the terminal to use the target frequency in an available frequency band that at least partially overlaps with the terahertz frequency band, the terminal may always perform data transmission with the access network device on the target frequency within a first duration of being authorized to use the target frequency, so that resource scheduling does not need to be repeated, resource scheduling time is saved, and a signaling interaction process before data transmission is reduced, thus improving communication efficiency.

Figure 5:
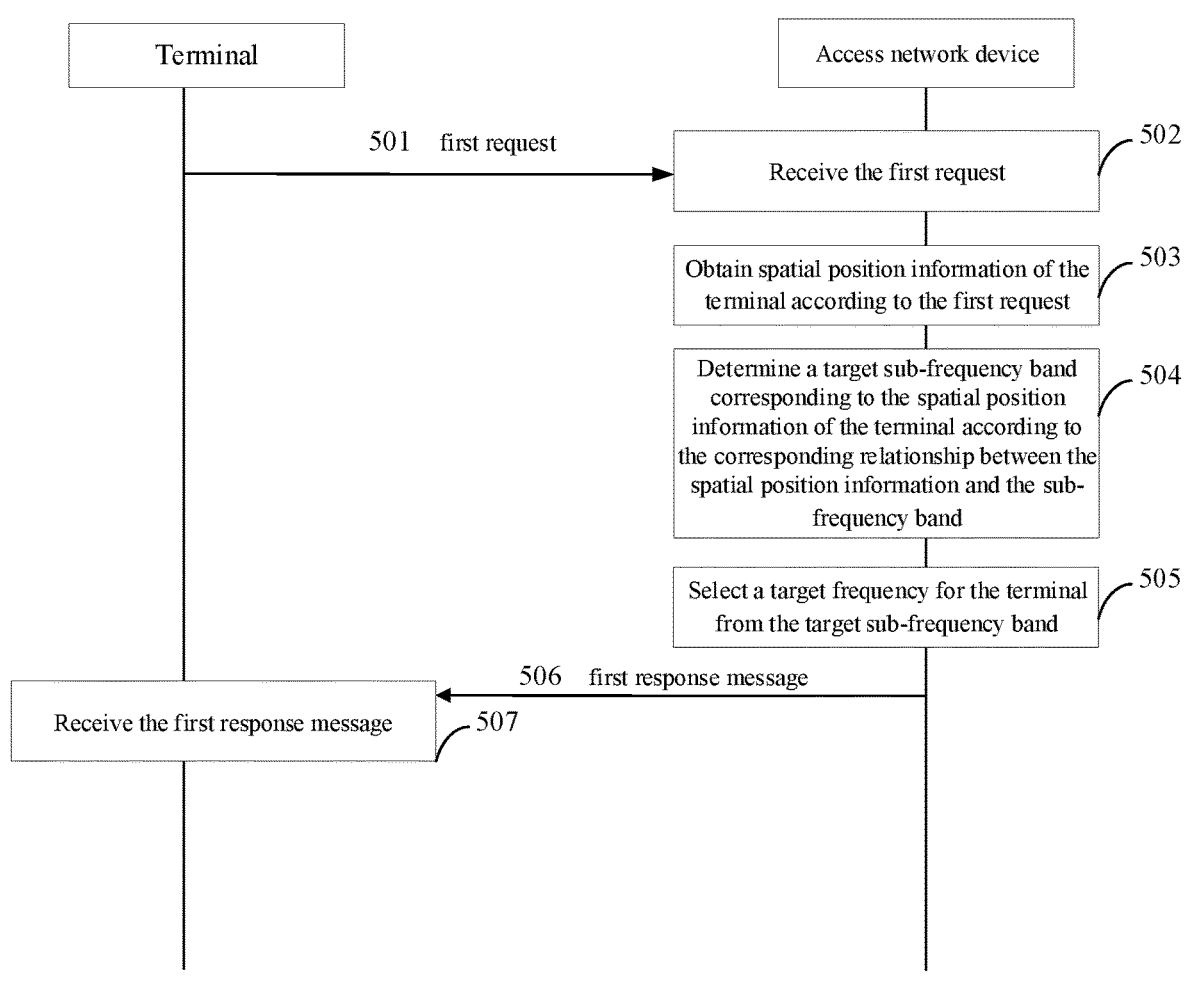
FIG. 5 is a flowchart of a method for frequency resource authorization according to an embodiment.

FIG. 5 is a flowchart of a method for frequency resource authorization according to an embodiment. The method may be executed by an access network device and a terminal together. Referring to FIG. 5, the method includes the following steps:

In step 501, the terminal sends a first request, where the first request is used for requesting to authorize the terminal to use a target frequency in an available frequency band within a first duration.

In step 502, the access network device receives the first request.

In step 503, the access network device obtains spatial position information of the terminal according to the first request.

Exemplarily, the spatial position information may be obtained from subscription information of the terminal. The type of the spatial position where the terminal is located may be divided by an operator. For example, the spatial position information includes, but is not limited to, indoor and outdoor.

In step 504, the access network device determines a target sub-frequency band corresponding to the spatial position information of the terminal according to the corresponding relationship between the spatial position information and the sub-frequency band.

In the corresponding relationship between the spatial position information and the sub-frequency band, the sub-frequency bands corresponding to different spatial positions are different. For example, the sub-frequency band corresponding to the indoor is K1, and the sub-frequency band corresponding to the outdoor is K2.

In step 505, the access network device selects a target frequency for the terminal from the target sub-frequency band.

The step 505 may refer to the foregoing step 406, and the detailed description is omitted here.

By means of the steps 504 and 505, the target frequency may be selected for the terminal from the sub-frequency band corresponding to the spatial position information of the terminal according to the corresponding relationship between the spatial position information and the sub-frequency band.

In step 506, the access network device sends a first response message to the terminal, where the first response message includes indication information of the target frequency.

In step 507, the terminal receives the first response message.

The step after step 507 may be the content after step 408 of the related embodiment of FIG. 4, and the detailed description is omitted here.

By sending the first request to the access network device, requesting the access network device to authorize the terminal to use the target frequency in an available frequency band that at least partially overlaps with the terahertz frequency band, the terminal may always perform data transmission with the access network device on the target frequency within a first duration of being authorized to use the target frequency, so that resource scheduling does not need to be repeated, resource scheduling time is saved, and a signaling interaction process before data transmission is reduced, thus improving communication efficiency.

Figure 6:
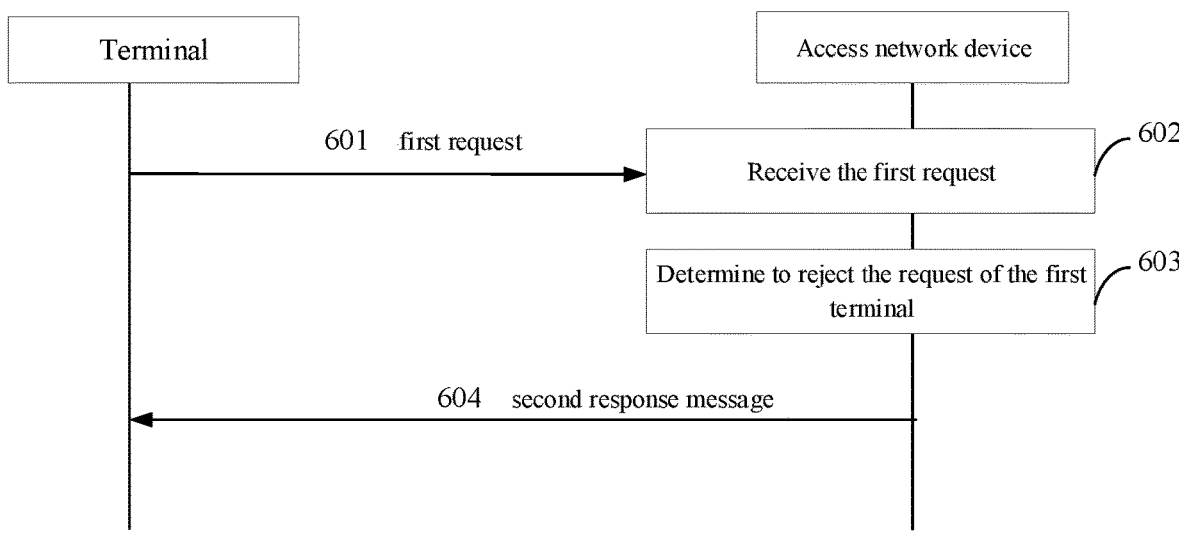
FIG. 6 is a flowchart of a method for frequency resource authorization according to an embodiment.

FIG. 6 is a flowchart of a method for frequency resource authorization according to an embodiment. The method may be executed by an access network device and a terminal together. Referring to FIG. 6, the method includes the following steps:

In step 601, the terminal sends a first request, where the first request is used for requesting to authorize the terminal to use a target frequency in an available frequency band within a first duration.

In step 602, the access network device receives the first request.

In step 603, the access network device determines to reject the request of the first terminal.

In step 604, the access network device sends a second response message to the terminal.

The second response message is used for indicating authorization rejection.

In some embodiments, the second response message further includes a reason for authorization rejection. The reason for authorization rejection includes, but is not limited to, no available frequency, a sub-frequency band supported by the terminal being completely different from a sub-frequency band supported by the base station, and the like, which is not limited in the present disclosure.

Figure 7:
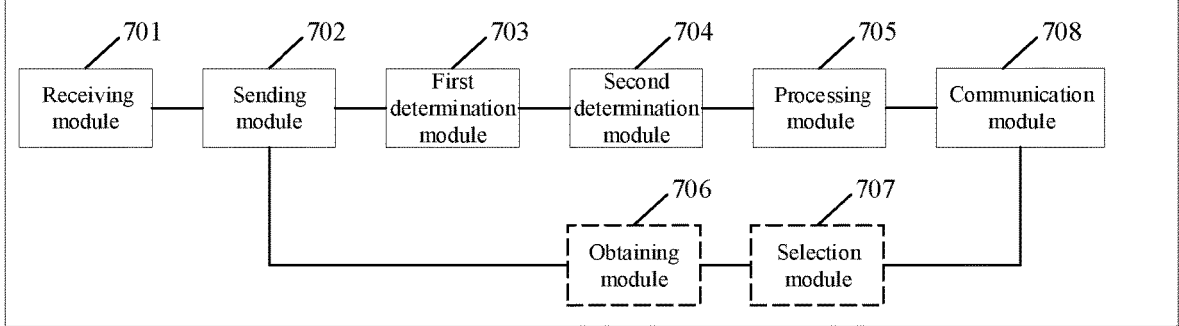
FIG. 7 is a schematic structural diagram of an apparatus for frequency resource authorization apparatus according to an embodiment.

FIG. 7 is a schematic structural diagram of an apparatus for frequency resource authorization according to an embodiment. The apparatus has a function of implementing the access network device in the foregoing method embodiment, and the function may be implemented by hardware, or may be implemented by hardware executing corresponding software. As shown in FIG. 7, the apparatus includes a receiving module 701 and a sending module 702.

Among them, the receiving module 701 is configured to receive a first request sent by a terminal, where the first request is used for requesting to authorize the terminal to use a target frequency in an available frequency band within a first duration, and the available frequency band at least partially overlaps with a terahertz frequency band.

The sending module 702 is configured to send a response message to the terminal according to the first request.

In some embodiments, the response message is one of a first response message and a second response message, the first response message includes indication information of the target frequency, and the second response message is used for indicating authorization rejection.

In some embodiments, the first response message further includes indication information for indicating the first duration.

In some embodiments, the available frequency band includes more than one sub-frequency band, the first request includes indication information for indicating a sub-frequency band set supported by the terminal, the sub-frequency band set supported by the terminal includes at least one sub-frequency band, and the target frequency belongs to one of the sub-frequency bands in the sub-frequency band set.

In some embodiments, the apparatus further includes:
a first determination module 703, configured to determine, according to the first request, a sub-frequency band supported by the terminal, where the sub-frequency band supported by the terminal belongs to the available frequency band;
a second determination module 704, configured to determine the target frequency according to the supported sub-frequency band of the terminal;

The sending module 702 is configured to send a first response message to the terminal, where the first response message includes indication information of the target frequency.

In some embodiments, the second determination module 704 is configured to obtain first bandwidth information of the terminal, where the first bandwidth information is used for indicating a bandwidth supported by or a bandwidth required for the terminal; and select, from the sub-frequency band supported by the terminal, a frequency matching with the bandwidth indicated by the first bandwidth information as the target frequency.

In some embodiments, the second determination module 704 is configured to determine the target frequency according to the sub-frequency band supported by the terminal on the basis of a service priority of the terminal.

In some embodiments, the receiving module 701 is further configured to receive second bandwidth information sent by the terminal, where the second bandwidth information is used for indicating an instant demand bandwidth of the terminal.

The apparatus further includes a processing module 705 configured to adjust a frequency domain width of the target frequency of the terminal to the instant demand bandwidth indicated by the second bandwidth information in response to determining that the instant demand bandwidth indicated by the second bandwidth information is different from the frequency domain bandwidth of the target frequency.

In some embodiments, the apparatus further includes:
an obtaining module 706, configured to obtain spatial position information of the terminal according to the first request;
a selection module 707, configured to select the target frequency for the terminal from a sub-frequency band corresponding to the spatial position information of the terminal according to a corresponding relationship between the spatial position information and the sub-frequency band;

The sending module 702 is configured to send a first response message to the terminal, where the first response message includes indication information of the target frequency.

In some embodiments, the sending module 702 is further configured to send a broadcast message, where the broadcast message includes indication information for indicating a sub-frequency band set supported by the access network device, the sub-frequency band set supported by the access network device includes at least one sub-frequency band, and the at least one sub-frequency band belongs to the available frequency band.

In some embodiments, the apparatus further includes:
a communication module 708, configured to communicate with the terminal at the target frequency until the first duration is reached or until the terminal is separated from a coverage range of the access network device.

In some embodiments, the apparatus further includes a release module configured to release the target frequency and releasing the target frequency is in response to one of the following:
a signal sent by the terminal using the target frequency being not received within a second duration, or
the first duration ending, or
the sub-frequency band in the available frequency band not including a sub-frequency band supported by the terminal.

In some embodiments, the available frequency band is the terahertz frequency band, or the available frequency band includes a partial frequency band of the terahertz frequency band, or the available frequency band is a combination of the terahertz frequency band and a partial millimeter wave frequency band close to the terahertz frequency band.

In some embodiments, a length unit of the first duration is day or month.

Figure 8:
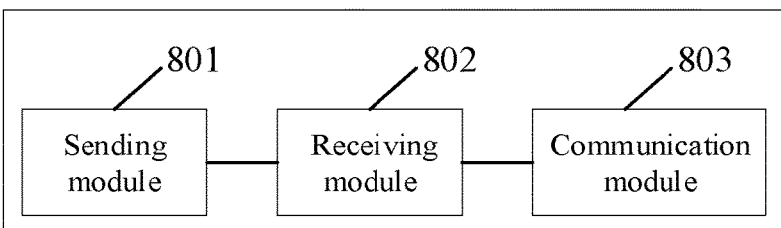
FIG. 8 is a schematic structural diagram of an apparatus for frequency resource authorization according to an embodiment.

FIG. 8 is a schematic structural diagram of an apparatus for frequency resource authorization according to an embodiment. The apparatus has a function of implementing the terminal in the foregoing method embodiment, and the function may be implemented by hardware, or may be implemented by hardware executing corresponding software. As shown in FIG. 8, the apparatus includes a sending module 801 and a receiving module 802.

Among them, the sending module 801 is configured to send a first request to an access network device, where the first request is used for requesting to authorize the terminal to use a target frequency in an available frequency band within a first duration, and the available frequency band at least partially overlaps with a terahertz frequency band.

The receiving module 802 is configured to receive a response message, where the response message is sent by the access network device according to the first request.

In some embodiments, the response message is one of a first response message and a second response message, the first response message includes indication information of the target frequency, and the second response message is used for indicating authorization rejection.

In some embodiments, the first response message further includes indication information for indicating the first duration.

In some embodiments, the available frequency band includes more than one sub-frequency band, the first request includes a sub-frequency band set supported by the terminal, the sub-frequency band set includes at least one sub-frequency band, and the target frequency belongs to one of the sub-frequency band in the sub-frequency band set.

In some embodiments, the sending module 801 is further configured to send second bandwidth information to the access network device after receiving the first response message, where the second bandwidth information is used for indicating an instant demand bandwidth of the terminal.

In some embodiments, the receiving module 802 is further configured to receive a broadcast message, where the broadcast message includes indication information for indicating a sub-frequency band set supported by the access network device, the sub-frequency band set supported by the access network device includes at least one sub-frequency band, and the at least one sub-frequency band belongs to the available frequency band.

In some embodiments, the apparatus further includes:
a communication module 803, configured to communicate with the access network device on the available frequency band until the first duration is reached or until the terminal is separated from a coverage range of the access network device.

In some embodiments, the available frequency band is the terahertz frequency band, or the available frequency band includes a partial frequency band of the terahertz frequency band, or the available frequency band is a combination of the terahertz frequency band and a partial millimeter wave frequency band close to the terahertz frequency band.

In some embodiments, a length unit of the first duration is day or month.

Figure 9:
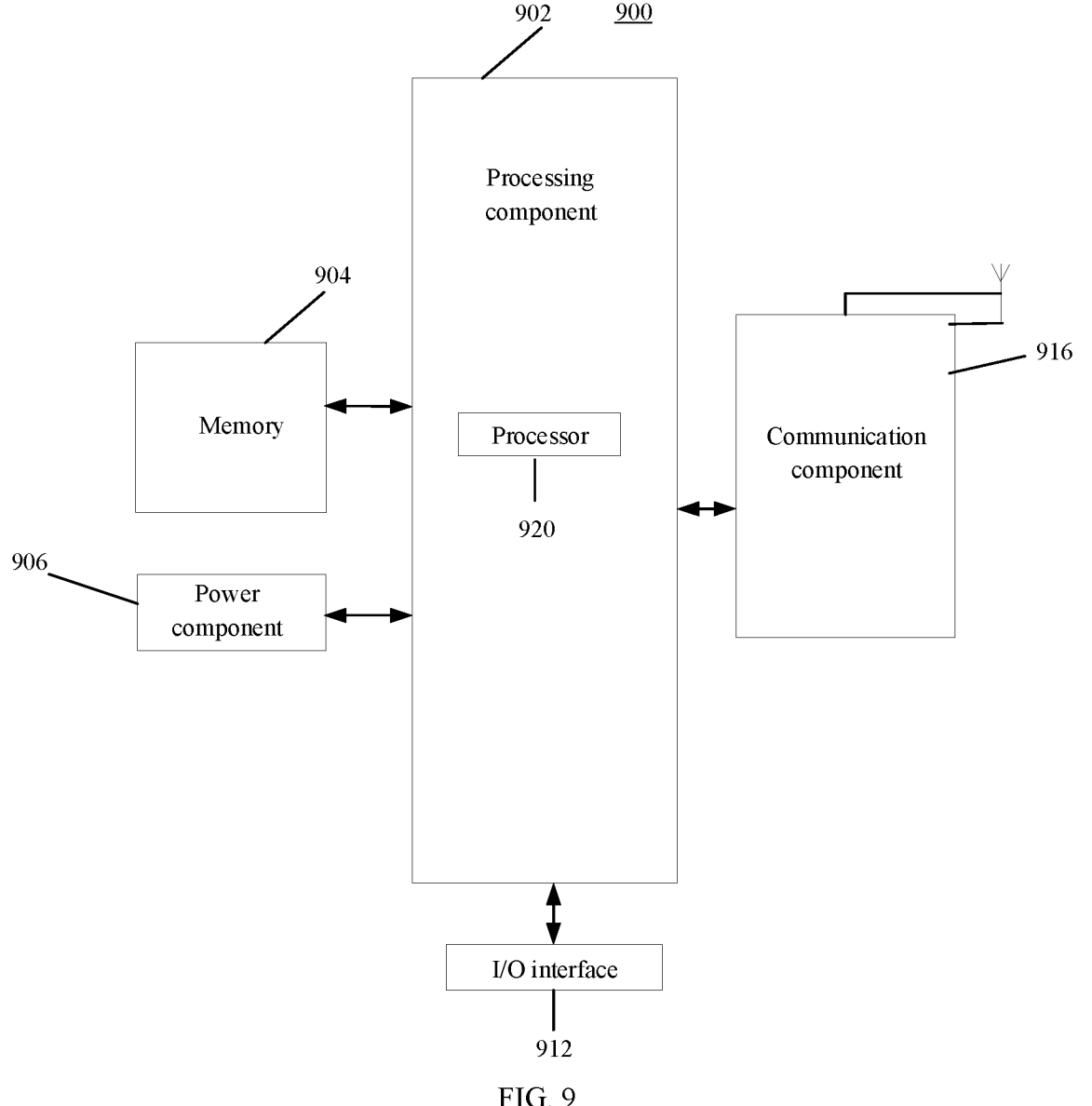
FIG. 9 is a block diagram of a device for frequency resource authorization according to an embodiment.

FIG. 9 is a block diagram of a device for frequency resource authorization 900 according to an embodiment, and the device 900 may be the foregoing access network device. Referring to FIG. 9, the device 900 for frequency resource authorization may include one or more of the following components: a processing component 902, a memory 904, a power component 906, an input/output (I/O) interface 912, and a communication component 916

The processing component 902 typically controls the overall operation of the device 900 for frequency resource authorization such as operations associated with display, telephone call, data communication, camera operation, and recording operation. The processing component 902 may include one or more processors 920 to execute instructions to complete all or some of the steps of the foregoing methods. In addition, the processing component 902 may include one or more modules to facilitate interaction between the processing component 902 and other components. For example, the processing component 902 may include a multimedia module to facilitate interaction between the multimedia component 908 and the processing component 902.

The memory 904 is configured to store various types of data to support operation at the device 900 for frequency resource authorization. The memory 904 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 906 provides electrical power for various components of the device 900 for frequency resource authorization. The power component 906 may include a power management system, one or more power sources, and other components associated with generating, managing, and allocating power to the device 900 for frequency resource authorization.

The I/O interface 912 provides an interface between the processing component 902 and the peripheral interface module, and the peripheral interface module may be a keyboard, a click wheel, a button, or the like. The buttons may include, but are not limited to, a home button, a volume button, a start button, and a lock button.

The communication component 916 is configured to facilitate wireless communication between the access network device and other devices. In embodiments of the present disclosure, the communication component 916 may provide a wireless network based on a communication standard, such as 2G, 3G, 4G, or 5G, or their combination, thus being connected to a terminal device.

In some embodiments, the device 900 for frequency resource authorization may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components for performing the above method for frequency resource authorization.

In some embodiments, there is also provided a non-transitory computer-readable storage medium including instructions, such as a memory 904 including instructions, which may be executed by the processor 920 of the device 900 for frequency resource authorization. For example, the non-transitory computer-readable storage medium may be a ROM, a random access memory (RAM), a CD-ROM, a magnetic tape, a floppy disk, an optical data storage device, etc.

Figure 10:
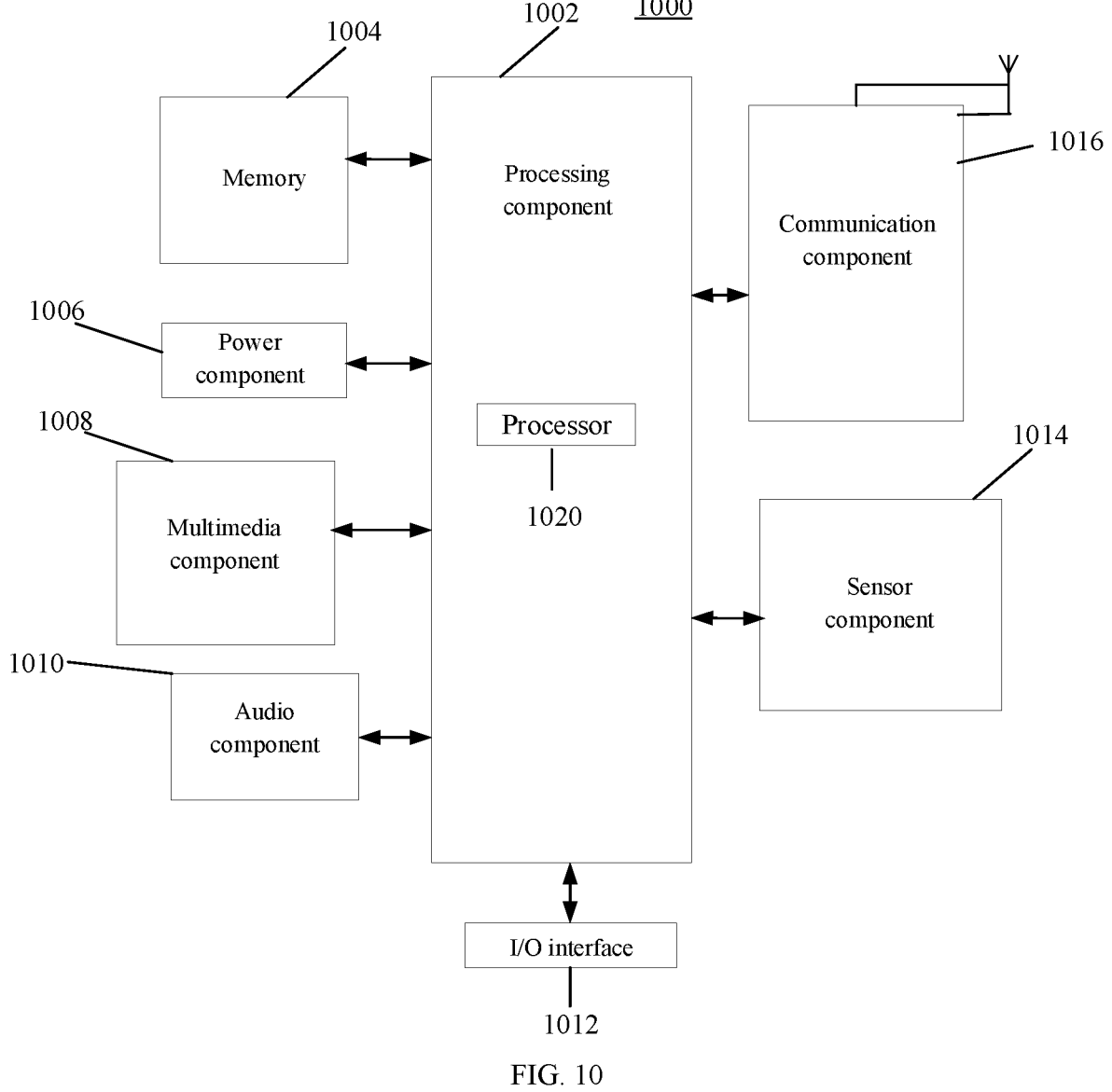
FIG. 10 is a block diagram of a device for frequency resource authorization according to an embodiment.

FIG. 10 is a block diagram of a device 1000 for frequency resource authorization according to an embodiment, and the device 1000 may be the foregoing terminal. Referring to FIG. 10, the device 1000 for frequency resource authorization may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls the overall operation of the device 1000 for frequency resource authorization, such as operations associated with display, telephone call, data communication, camera operation, and recording operation. The processing component 1002 may include one or more processors 1020 to execute instructions to complete all or some of the steps of the foregoing methods. In addition, the processing component 1002 may include one or more modules to facilitate interaction between the processing component 1002 and other components. For example, the processing component 1002 may include a multimedia module to facilitate interaction between the multimedia component 1008 and the processing component 1002.

The memory 1004 is configured to store various types of data to support operation at the device 1000 for frequency resource authorization. Examples of such data include instructions for any application or method operating on device 1000 for frequency resource authorization, contact data, phonebook data, messages, pictures, videos, and the like. The memory 1004 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 1006 provides electrical power to various components of the device 1000 for frequency resource authorization. The power component 1006 may include a power management system, one or more power sources, and other components associated with generating, managing, and allocating power to the device 1000 for frequency resource authorization.

The multimedia component 1008 includes a screen providing an output interface between the device 1000 for frequency resource authorization and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touches, sliding, and gestures on the touch panel. The touch sensor may not only sense a boundary of a touch or swipe action, but also detect a duration and pressure associated with the touch or swipe action. In some embodiments, the multimedia component 1008 includes a front-facing camera and/or a rear-facing camera. When the device 1000 for frequency resource authorization is in an operation mode, such as a photographing mode or a video mode, the front-facing camera and/or the rear-facing camera may receive external multimedia data. Each front camera and the rear camera may be a fixed optical lens system or have a focal length and an optical zoom capability.

The audio component 1010 is configured to output and/or input an audio signal. For example, the audio component 1010 includes a microphone (MIC) configured to receive an external audio signal when the device 1000 for frequency resource authorization is in an operating mode, such as a call mode, a recording mode, and a speech recognition mode. The received audio signal may be further stored in the memory 1004 or transmitted via the communication component 1016. In some embodiments, the audio component 1010 further includes a speaker configured to output an audio signal.

The I/O interface 1012 provides an interface between the processing component 1002 and the peripheral interface module, and the peripheral interface module may be a keyboard, a click wheel, a button, or the like. The buttons may include, but are not limited to, a home button, a volume button, a start button, and a lock button.

The sensor component 1014 includes one or more sensors for providing status assessments of various aspects for the device 1000 for frequency resource authorization. For example, the sensor component 1014 may detect the on/off state of the device 1000 for frequency resource authorization, the relative positioning of the component, such as the display of the device 1000 for frequency resource authorization and the keypad, and the sensor component 1014 may also detect the location change of one component of the device 1000 for frequency resource authorization or the device 1000 for frequency resource authorization, the presence or absence of the contact between the user and the device 1000 for frequency resource authorization, the orientation or acceleration/deceleration of the device 1000 for frequency resource authorization, and the temperature change of the device 1000 for frequency resource authorization. The sensor component 1014 may include a proximity sensor configured to detect the presence of nearby objects without any physical contact. The sensor assembly 1014 may also include a light sensor, such as a CMOS or CCD image sensor, for use in an imaging application. In some embodiments, the sensor component 1014 may further include an acceleration sensor, a gyroscope sensor, a magnetic sensor, a pressure sensor, or a temperature sensor.

The communication component 1016 is configured to facilitate wireless communication between the device 1000 for frequency resource authorization and other devices. In embodiments of the present disclosure, the communication component 1016 may access a wireless network based on a communication standard, such as 2G, 3G, 4G, or 5G, or their combination, thus implementing random access. In one embodiment, communication component 1016 receives broadcast signals or broadcast related information from an external broadcast management system via a broadcast channel. In some embodiments, the communication component 1016 further includes an NFC module.

In some embodiments, the device 1000 for frequency resource authorization may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components for performing the above method for frequency resource authorizations.

In some embodiments there is further provided a non-transitory computer-readable storage medium including instructions, such as a memory 1004 including instructions, and the instructions may be executed by the processor 1020 of the device 1000 for frequency resource authorization. For example, the non-transitory computer-readable storage medium may be a ROM, a random access memory (RAM), a CD-ROM, a magnetic tape, a floppy disk, an optical data storage device, etc.

An embodiment of the present disclosure further provides a communication system, where the communication includes an access network device and a terminal. The access network device is a device for frequency resource authorization provided in the embodiment shown in FIG. 9. The terminal is a device for frequency resource authorization provided in the embodiment shown in FIG. 10.

Other embodiments of the present disclosure will be apparent to those skilled in the art from consideration of the specification and practice of the invention disclosed herein. This application is intended to cover any variations, uses, or adaptations of the present disclosure following the general principles of the present disclosure and including common general knowledge or customary technical means in the art not disclosed in the present disclosure. It is intended that the specification and examples be considered as example only, with a true scope and spirit of the disclosure being indicated by the following claims.

It should be understood that the present disclosure is not limited to the precise construction that has been described above and illustrated in the accompanying drawings, and various modifications and changes may be made without departing from the scope of the present disclosure. It is intended that the scope of the present disclosure be limited only by the appended claims.

According to a first aspect of the present disclosure, there is provided a method frequency resource authorization, including:

receiving a first request sent by a terminal, where the first request is used for requesting to authorize the terminal to use a target frequency in an available frequency band within a first duration, and the available frequency band at least partially overlaps with a terahertz frequency band; and sending a response message to the terminal according to the first request.

In some embodiments, the response message is one of a first response message and a second response message, the first response message includes indication information of the target frequency, and the second response message is used for indicating authorization rejection.

In some embodiments, the first response message further includes indication information for indicating the first duration.

In some embodiments, the available frequency band includes more than one sub-frequency band, the first request includes indication information for indicating a sub-frequency band set supported by the terminal, the sub-frequency band set supported by the terminal includes at least one of the sub-frequency band, and the target frequency belongs to one of the sub-frequency band in the sub-frequency band set.

In some embodiments, the first request is used for requesting to authorize the terminal to use the target frequency within the first duration; or the first request is used for requesting to authorize a terminal in a group where the terminal is located to jointly use the target frequency within the first duration.

In some embodiments, the method further includes:

determining a sub-frequency band supported by the terminal according to the first request, where the sub-frequency band supported by the terminal belongs to the available frequency band; and determining the target frequency according to the sub-frequency band supported by the terminal;

the sending the response message to the terminal according to the first request includes:

sending a first response message to the terminal, where the first response message includes the indication information of the target frequency.

In some embodiments, the determining the target frequency according to the sub-frequency band supported by the terminal includes:

obtaining first bandwidth information of the terminal, where the first bandwidth information is used for indicating a bandwidth supported by or a bandwidth required for the terminal; and selecting, from the sub-frequency band supported by the terminal, a frequency matching with the bandwidth indicated by the first bandwidth information as the target frequency In some embodiments, the determining the target frequency according to the sub-frequency band supported by the terminal includes:

determining the target frequency according to the sub-frequency band supported by the terminal on the basis of a service priority of the terminal.

In some embodiments, the method further includes:

receiving second bandwidth information sent by the terminal, where the second bandwidth information is used for indicating an instant demand bandwidth of the terminal;

adjusting a frequency domain width of the target frequency of the terminal to the instant demand bandwidth indicated by the second bandwidth information, in response to determining that the instant demand bandwidth indicated by the second bandwidth information is different from the frequency domain bandwidth of the target frequency.

In some embodiments, the method further includes:

obtaining spatial position information of the terminal according to the first request;

selecting the target frequency for the terminal from a sub-frequency band corresponding to the spatial position information of the terminal according to a corresponding relationship between the spatial position information and the sub-frequency band;

the sending the response message to the terminal according to the first request, includes:

sending a first response message to the terminal, where the first response message includes indication information of the target frequency.

In some embodiments, the method further includes:

sending a broadcast message, where the broadcast message includes indication information for indicating a sub-frequency band set supported by an access network device, the sub-frequency band set supported by the access network device includes at least one sub-frequency band, and the at least one sub-frequency band belongs to the available frequency band.

In some embodiments, the method further includes:

communicating with the terminal at the target frequency until the first duration is reached or until the terminal is separated from a coverage range of the access network device.

In some embodiments, the method further includes:

releasing the target frequency, in response to one of followings:

a signal sent by the terminal using the target frequency being not received within a second duration, or the first duration ending, or the terminal being separated from a coverage range of an access network device.

In some embodiments, the available frequency band is the terahertz frequency band, or the available frequency band includes a partial frequency band of the terahertz frequency band, or the available frequency band is a combination of the terahertz frequency band and a partial millimeter wave frequency band close to the terahertz frequency band.

In some embodiments, a length unit of the first duration is day or month.

According to a second aspect of the present disclosure, there is provided a method for frequency resource authorization, including:

sending, by a terminal, a first request to an access network device, where the first request is used for requesting to authorize the terminal to use a target frequency in an available frequency band within a first duration, and the available frequency band at least partially overlaps with a terahertz frequency band;

receiving a response message, where the response message is sent by the access network device according to the first request.

In some embodiments, the response message is one of a first response message and a second response message, the first response message includes indication information of the target frequency, and the second response message is used for indicating authorization rejection.

In some embodiments, the first response message further includes indication information for indicating the first duration.

In some embodiments, the available frequency band includes more than one sub-frequency band, the first request includes a sub-frequency band set supported by the terminal, the sub-frequency band set includes at least one sub-frequency band, and the target frequency belongs to one of the sub-frequency band in the sub-frequency band set.

In some embodiments, the first request is used for requesting to authorize the terminal to use the target frequency within a first duration; or, the first request is used for requesting to authorize a terminal in a group where the terminal is located to jointly use the target frequency within the first duration.

In some embodiments, the method further includes:

sending second bandwidth information to the access network device, where the second bandwidth information is used for indicating an instant demand bandwidth of the terminal.

In some embodiments, the method further includes:

receiving a broadcast message, where the broadcast message includes indication information for indicating a sub-frequency band set supported by the access network device, the sub-frequency band set supported by the access network device includes at least one sub-frequency band, and the at least one sub-frequency band belongs to the available frequency band.

In some embodiments, the method further includes:

communicating with the access network device on the available frequency band until a first duration is reached or until the terminal is separated from a coverage range of the access network device.

In some embodiments, the available frequency band is the terahertz frequency band, or the available frequency band includes a partial frequency band of the terahertz frequency band, or the available frequency band is a combination of the terahertz frequency band and a partial millimeter wave frequency band close to the terahertz frequency band.

In some embodiments, a length unit of the first duration is day or month.

According to a third aspect of the present disclosure, there is provided an apparatus for frequency resource authorization, including:

a receiving module, configured to receive a first request sent by a terminal, where the first request is used for requesting to authorize the terminal to use a target frequency in an available frequency band within a first duration, and the available frequency band at least partially overlaps with a terahertz frequency band;

a sending module, configured to send a response message to the terminal according to the first request.

In some embodiments, the response message is one of a first response message and a second response message, the first response message includes indication information of the target frequency, and the second response message is used for indicating authorization rejection.

In some embodiments, the first response message further includes indication information for indicating the first duration.

In some embodiments, the available frequency band includes more than one sub-frequency band, the first request includes indication information for indicating a sub-frequency band set supported by the terminal, the sub-frequency band set supported by the terminal includes at least one sub-frequency band, and the target frequency belongs to one of the sub-frequency band in the sub-frequency band set.

In some embodiments, the first request is used for requesting to authorize the terminal to use the target frequency within a first duration; or, the first request is used for requesting to authorize a terminal in a group where the terminal is located to jointly use the target frequency within the first duration.

In some embodiments, the apparatus further includes:

a first determination module, configured to determine a sub-frequency band supported by the terminal according to the first request, where a sub-frequency band supported by the terminal belongs to the available frequency band;

a second determination module, configured to determine the target frequency according to the supported sub-frequency band of the terminal;

the sending module is configured to send a first response message to the terminal, where the first response message includes indication information of the target frequency.

In some embodiments, the second determination module is configured to obtain first bandwidth information of the terminal, where the first bandwidth information is used for indicating a bandwidth supported by or a bandwidth required for the terminal; and select, from the sub-frequency band supported by the terminal, a frequency matching with the bandwidth indicated by the first bandwidth information as the target frequency.

In some embodiments, the second determination module is configured to determine the target frequency according to the sub-frequency band supported by the terminal on the basis of a service priority of the terminal.

In some embodiments, the receiving module is further configured to receive second bandwidth information sent by the terminal, where the second bandwidth information is used for indicating an instant demand bandwidth of the terminal.

The apparatus further includes a processing module configured to adjust a frequency domain width of the target frequency of the terminal to the instant demand bandwidth indicated by the second bandwidth information in response to determining that the instant demand bandwidth indicated by the second bandwidth information is different from the frequency domain bandwidth of the target frequency.

In some embodiments, the apparatus further includes:

an obtaining module, configured to obtain spatial position information of the terminal according to the first request; and a selection module, configured to select a target frequency for the terminal from a sub-frequency band corresponding to the spatial position information of the terminal according to a corresponding relationship between the spatial position information and the sub-frequency band;

The sending module is configured to send a first response message to the terminal, where the first response message includes indication information of the target frequency.

In some embodiments, the sending module is further configured to send a broadcast message, where the broadcast message includes indication information for indicating a sub-frequency band set supported by the access network device, the sub-frequency band set supported by the access network device includes at least one sub-frequency band, and the at least one sub-frequency band belongs to the available frequency band.

In some embodiments, the apparatus further includes:

a communication module, configured to communicate with the terminal at the target frequency until a first duration is reached or until the terminal is separated from a coverage range of the access network device.

In some embodiments, the apparatus further includes a release module configured to release the target frequency and releasing the target frequency is in response to one of the followings:

a signal sent by the terminal using the target frequency being not received within a second duration, or the first duration ending, or the terminal being separated from a coverage range of an access network device.

In some embodiments, the available frequency band is the terahertz frequency band, or the available frequency band includes a partial frequency band of the terahertz frequency band, or the available frequency band is a combination of the terahertz frequency band and a partial millimeter wave frequency band close to the terahertz frequency band.

In some embodiments, a length unit of the first duration is day or month.

According to a fourth aspect of the present disclosure, there is provided an apparatus for frequency resource authorization, including:

a sending module, configured to send a first request to an access network device, where the first request is used for requesting to authorize the terminal to use a target frequency in an available frequency band within a first duration, and the available frequency band at least partially overlaps with a terahertz frequency band;

a receiving module, configured to receive a response message, where the response message is sent by the access network device according to the first request.

In some embodiments, the response message is one of a first response message and a second response message, the first response message includes indication information of the target frequency, and the second response message is used for indicating authorization rejection.

In some embodiments, the first response message further includes indication information for indicating the first duration.

In some embodiments, the available frequency band includes more than one sub-frequency band, and the first request includes a sub-frequency band set supported by a terminal, the sub-frequency band set includes at least one of the sub-frequency band, and the target frequency belongs to one of the sub-frequency band in the sub-frequency band set.

In some embodiments, the first request is used for requesting to authorize the terminal to use the target frequency within the first duration; or, the first request is used for requesting to authorize a terminal in a group where the terminal is located to jointly use the target frequency within the first duration.

In some embodiments, the sending module is further configured to send second bandwidth information to the access network device, where the second bandwidth information is used for indicating an instant demand bandwidth of the terminal.

In some embodiments, the receiving module is further configured to receive a broadcast message, where the broadcast message includes indication information for indicating a sub-frequency band set supported by the access network device, the sub-frequency band set supported by the access network device includes at least one sub-frequency band, and the at least one sub-frequency band belongs to the available frequency band.

In some embodiments, the apparatus further includes:

a communication module, configured to communicate with the access network device on the available frequency band until a first duration is reached or until the terminal is separated from a coverage range of the access network device.

In some embodiments, the available frequency band is the terahertz frequency band, or the available frequency band includes a partial frequency band of the terahertz frequency band, or the available frequency band is a combination of the terahertz frequency band and a partial millimeter wave frequency band close to the terahertz frequency band.

In some embodiments, a length unit of the first duration is day or month.

According to a fifth aspect of the present disclosure, there is provided a device for frequency resource authorization, including: a processor; and a memory configured to store an executable instruction by the processor, where the processor is configured to load and execute the executable instruction to implement the method for frequency resource authorization according to the first aspect or the second aspect.

According to a sixth aspect of the present disclosure, there is provided a computer-readable storage medium and when an instruction in the computer-readable storage medium is executed by a processor, the method for frequency resource authorization according to the first aspect or the second aspect can be executed.

The technical solutions provided in the embodiments of the present disclosure may include the following beneficial effects:

By sending the first request to the access network device, and requesting the access network device to authorize the terminal to use the target frequency in an available frequency band that at least partially overlaps with the terahertz frequency band, the terminal may always perform data transmission with the access network device on the target frequency within a first duration of being authorized to use the target frequency, so that resource scheduling does not need to be repeated, resource scheduling time is saved, and a signaling interaction process before data transmission is reduced, thus improving communication efficiency.

What is claimed is:

1. A method for frequency resource authorization, comprising:

receiving, by an access network device, a first request sent by a terminal, wherein the first request is used for requesting to authorize the terminal to use a target frequency in an available frequency band within a first duration, and the available frequency band at least partially overlaps with a terahertz frequency band;

sending, by the access network device, a response message to the terminal according to the first request;

determining a sub-frequency band supported by the terminal according to the first request, wherein the sub-frequency band supported by the terminal belongs to the available frequency band; and determining the target frequency according to the sub-frequency band supported by the terminal, wherein the response message comprises a first response message, and the first response message comprises indication information of the target frequency.

2. The method according to claim 1, wherein the response message further comprises a second response message, and the second response message is used for indicating authorization rejection.

3. The method according to claim 2, wherein the first response message further comprises indication information for indicating the first duration.

4. The method according to claim 2, wherein the available frequency band comprises more than one sub-frequency band, the first request comprises indication information for indicating a sub-frequency band set supported by the terminal, the sub-frequency band set supported by the terminal comprises the sub-frequency band, and the target frequency belongs to the sub-frequency band in the sub-frequency band set.

5. The method according to claim 1, wherein the first request is used for requesting to authorize the terminal to use the target frequency within the first duration; or the first request is used for requesting to authorize a terminal in a group where the terminal is located to jointly use the target frequency within the first duration.

6. The method according to claim 1, wherein determining the target frequency according to the sub-frequency band supported by the terminal comprises:

obtaining first bandwidth information of the terminal, wherein the first bandwidth information is used for indicating a bandwidth supported by or a bandwidth required for the terminal; and selecting, from the sub-frequency band supported by the terminal, a frequency matching with the bandwidth indicated by the first bandwidth information as the target frequency.

7. The method according to claim 6, further comprising:

receiving second bandwidth information sent by the terminal, wherein the second bandwidth information is used for indicating an instant demand bandwidth of the terminal; and adjusting a frequency domain width of the target frequency of the terminal to the instant demand bandwidth, in response to determining that the instant demand bandwidth is different from the frequency domain bandwidth of the target frequency.

8. The method according to claim 1, wherein determining the target frequency according to the sub-frequency band supported by the terminal comprises:

determining the target frequency according to the sub-frequency band supported by the terminal on the basis of a service priority of the terminal.

9. The method according to claim 1, further comprising:

obtaining spatial position information of the terminal according to the first request;

selecting the target frequency for the terminal from a sub-frequency band corresponding to the spatial position information of the terminal according to a corresponding relationship between the spatial position information and the sub-frequency band.

10. The method according to claim 1, further comprising:

sending a broadcast message, wherein the broadcast message comprises indication information for indicating a sub-frequency band set supported by an access network device, the sub-frequency band set supported by the access network device comprises at least one sub-frequency band, and the at least one sub-frequency band belongs to the available frequency band.

11. The method according to claim 1, further comprising:

communicating with the terminal at the target frequency until the first duration is reached or until the terminal is separated from a coverage range of the access network device.

12. The method according to claim 1, further comprising:

releasing the target frequency, in response to one of:

a signal sent by the terminal using the target frequency being not received within a second duration, or the first duration ending, or the terminal being separated from a coverage range of an access network device.

13. The method according to claim 1, wherein the available frequency band comprises the terahertz frequency band, or the available frequency band comprises a partial frequency band of the terahertz frequency band, or the available frequency band comprises a combination of the terahertz frequency band and a partial millimeter wave frequency band close to the terahertz frequency band; or a length unit of the first duration is day or month.

14. A method for frequency resource authorization, comprising:

sending, by a terminal, a first request to an access network device, wherein the first request is used for requesting to authorize a terminal to use a target frequency in an available frequency band within a first duration, and the available frequency band at least partially overlaps with a terahertz frequency band; and receiving, by the terminal, a response message, wherein the response message is sent by the access network device according to the first request;

wherein the response message comprises a first response message, the first response message comprises indication information of the target frequency, the target frequency is determined by the access network device according to a sub-frequency band supported by the terminal, the sub-frequency band supported by the terminal is determined by the access network device according to the first request, and the sub-frequency band supported by the terminal belongs to the available frequency band.

15. The method according to claim 14, further comprising:

sending second bandwidth information to the access network device, wherein the second bandwidth information is used for indicating an instant demand bandwidth of the terminal.

16. The method according to claim 14, further comprising:

receiving a broadcast message, wherein the broadcast message comprises indication information for indicating a sub-frequency band set supported by the access network device, the sub-frequency band set supported by the access network device comprises at least one sub-frequency band, and the at least one sub-frequency band belongs to the available frequency band.

17. The method according to claim 14, further comprising:

communicating with the access network device on the available frequency band until the first duration is reached or until the terminal is separated from a coverage range of the access network device.

18. A device for frequency resource authorization, comprising:

a processor; and a memory, configured to store an executable instruction by the processor;

wherein the processor is configured to load and execute the executable instruction to implement the method for frequency resource authorization according to claim 14.

19. A device for frequency resource authorization, comprising:

a processor; and a memory, configured to store an executable instruction by the processor;

wherein the processor is configured to load and execute the executable instruction to cause the device to:

receive a first request sent by a terminal, wherein the first request is used for requesting to authorize the terminal to use a target frequency in an available frequency band within a first duration, and the available frequency band at least partially overlaps with a terahertz frequency band;

send a response message to the terminal according to the first request;

determine a sub-frequency band supported by the terminal according to the first request, wherein the sub-frequency band supported by the terminal belongs to the available frequency band; and determine the target frequency according to the sub-frequency band supported by the terminal, wherein the response message comprises a first response message, and the first response message comprises indication information of the target frequency.

\*  \*  \*  \*  \*